(12) United States Patent  
Langenfeld

(10) Patent No.: US 9,193,429 B1  
(45) Date of Patent: Nov. 24, 2015

(54) SYSTEMS AND METHODS FOR INDICATING OIL LEVEL IN OUTBOARD MOTORS

(71) Applicant: Brunswick Corporation, Lake Forest, IL (US)

(72) Inventor: Gregg D. Langenfeld, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 269 days.

(21) Appl. No.: 13/692,961

(22) Filed: Dec. 3, 2012

(51) Int. Cl.
| | |
|---|---|
| B63H 20/00 | (2006.01) |
| B63H 21/38 | (2006.01) |
| F01M 11/12 | (2006.01) |
| F01M 1/18 | (2006.01) |
| F01M 11/10 | (2006.01) |

(52) U.S. Cl.
CPC .............. *B63H 20/002* (2013.01); *B63H 20/00* (2013.01); *B63H 21/386* (2013.01); *F01M 1/18* (2013.01); *F01M 11/10* (2013.01); *F01M 11/12* (2013.01); *F16N 2260/04* (2013.01)

(58) Field of Classification Search
CPC .... B63H 20/001; B63H 20/002; B63H 21/38; B63H 21/386; B60R 16/0231; B60R 16/0232; F01M 1/18; F01M 11/10; F01M 11/12; F01M 2001/14; F01M 2001/1453; F16N 29/00; F16N 2210/06; F16N 2250/18; F16N 2260/04; G01F 23/00; G01F 23/04; G01F 23/24; G01F 23/241; G01F 23/246

USPC ........ 440/2, 88 L; 73/290 R, 293, 295, 304 R, 73/305–308; 184/6.4, 108; 340/450, 340/450.3, 618–622, 984

See application file for complete search history.

(56) References Cited

U.S. PATENT DOCUMENTS

| | | | |
|---|---|---|---|
| 3,412,610 | A | 11/1968 | Prussin |
| 3,792,456 | A | 2/1974 | Hill |
| 4,110,740 | A | 8/1978 | Akita et al. |
| 4,887,068 | A * | 12/1989 | Umehara ................... 340/450.3 |
| 4,903,653 | A | 2/1990 | Slattery |
| 4,921,071 | A | 5/1990 | Lonnborg et al. |
| 4,940,965 | A | 7/1990 | Umehara |
| 5,103,673 | A * | 4/1992 | Sawada et al. ................... 73/313 |
| 5,205,172 | A * | 4/1993 | Doak ............................ 73/295 |
| 5,299,456 | A * | 4/1994 | Steiner .......................... 73/308 |
| 6,227,921 | B1 | 5/2001 | Feehan |
| 6,237,411 | B1 | 5/2001 | Schimmel et al. |
| 6,578,415 | B2 | 6/2003 | Schimmel et al. |
| 7,509,753 | B2 * | 3/2009 | Nicosia et al. .................. 33/716 |
| 7,571,032 | B2 | 8/2009 | Kanno et al. |

FOREIGN PATENT DOCUMENTS

JP     2010242703 A    * 10/2010

* cited by examiner

*Primary Examiner* — Ajay Vasudeva  
(74) *Attorney, Agent, or Firm* — Andrus Intellectual Property Law, LLP

(57) ABSTRACT

Systems and methods are for indicating oil level in an outboard motor to an operator. An outboard motor has an internal combustion engine that drains oil to a sump; a sensor that senses oil level in the sump; and an input device and an indicator on the outboard motor. Actuation of the input device causes the sensor to determine the oil level, and then the indicator to indicate to the oil level to the operator.

21 Claims, 4 Drawing Sheets

SYSTEMS AND METHODS FOR INDICATING OIL LEVEL IN OUTBOARD MOTORS

FIELD

The present disclosure relates to outboard motors.

BACKGROUND

U.S. Pat. No. 4,921,071, which is incorporated herein by reference in its entirety, discloses a transparent container mounted to the inner transom wall of a boat and connected to the oil passages in a stern drive unit. The container is provided with a removable cap having a one-way valve of the Vernay type therein. The valve prevents outward leakage of lubricant fluid from the container, but permits inward passage of air so that, during engine and drive unit cooling, lubricant can be sucked back into the system through the drive housings. The cap may be provided with a lubricant level warning device which extends downwardly into the container.

U.S. Pat. No. 6,227,921, which is incorporated herein by reference in its entirety, discloses a marine propulsion device, such as an outboard motor, provided with an oil measuring gauge or dipstick which is accessible by the operator of the outboard motor without having to remove the cowl from the device. A first end of the dipstick extends through a dipstick tube into the oil sump of the outboard motor and a second end of the dipstick is connected to a handle that extends through the cowl. The handle is shaped to be retained in a hole formed through the cowl in such a way that the hole is sealed by a portion of the handle to prevent water from passing into the engine compartment through the cowl. A dampening mechanism is provided to dampen vibrations that would otherwise be transmitted between the handle and the dipstick.

U.S. patent application Ser. No. 13/313,930, filed Dec. 7, 2011, discloses systems and methods for determining oil level in a marine outboard motor having an internal combustion engine. A control circuit determines whether oil has drained back into a sump from the internal combustion engine. An oil sensor senses an oil level in the sump. The control circuit calculates a characteristic of the actual oil level of the outboard motor based upon the oil level after the oil has drained back into the sump and based upon a trim position of the outboard motor.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some examples, systems are provided for indicating oil level in an outboard motor to an operator. An outboard motor has an internal combustion engine that drains oil to a sump; a sensor that senses oil level in the sump; and an input device and an indicator on the outboard motor. Actuation of the input device causes the sensor to determine the oil level in the sump, and then the indicator to indicate the oil level to the operator.

In other examples, systems are provided for indicating oil level in an outboard motor to an operator. An outboard motor has an internal combustion engine that drains oil to a sump; a sensor that senses oil level in the sump; an input device and an indicator on the outboard motor; and a control circuit that is in communication with the sensor, input device, and indicator. Actuation of the input device causes the control circuit to communicate with the sensor to determine the oil level in the sump, and then to operate the indicator to indicate the oil level to the operator.

In other examples, methods are for indicating oil level in an outboard motor to an operator. The methods can comprise actuating an input device located on the outboard motor, sensing oil level in the sump upon actuation of the input device, and operating an indicator on the outboard motor to indicate the oil level to an operator.

BRIEF DESCRIPTION OF THE DRAWINGS

Embodiments of systems and methods for indicating oil level in outboard motors are described with reference to the following figures. The same numbers are used throughout the figures to reference like features and components.

DETAILED DESCRIPTION OF THE DRAWINGS

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
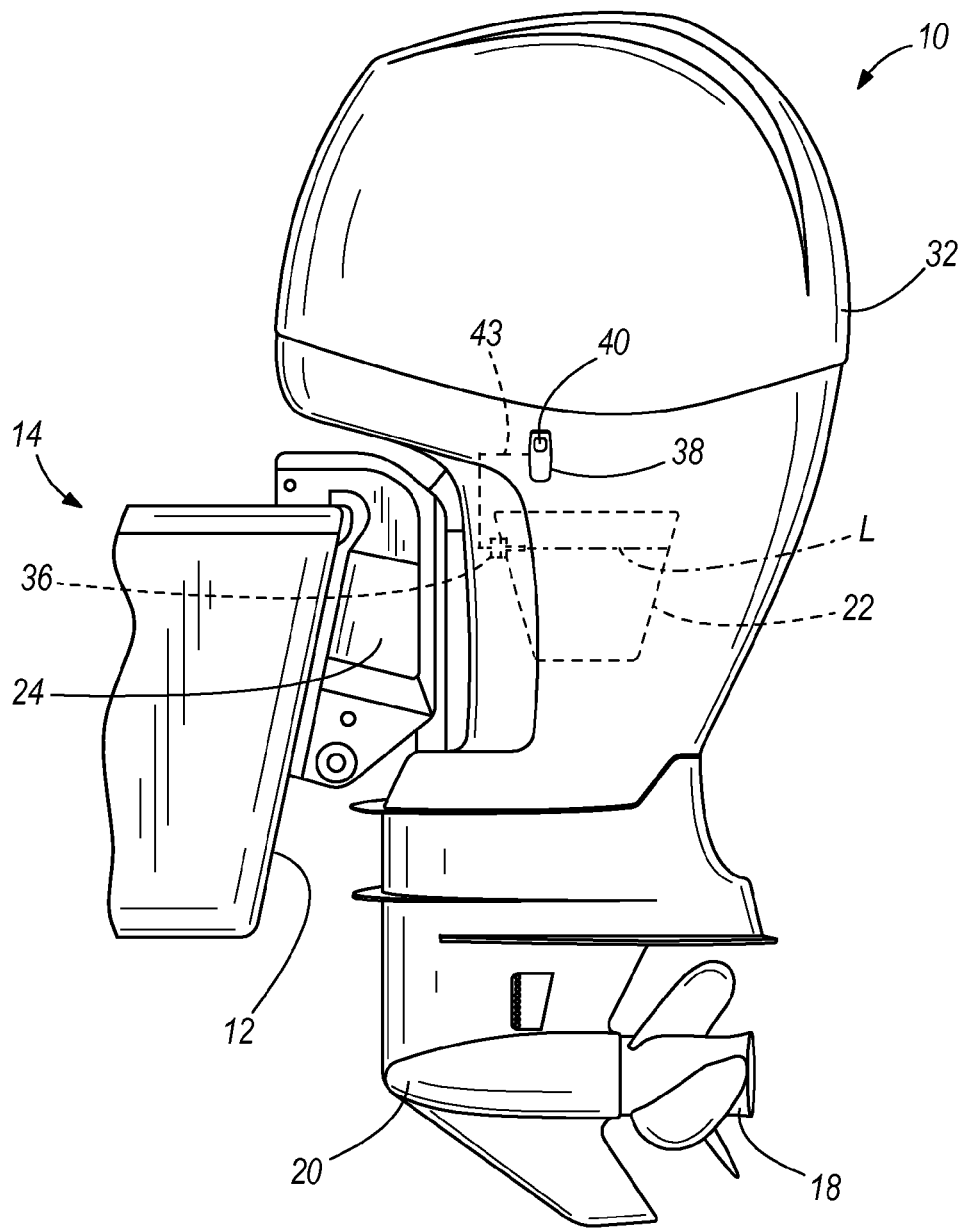
FIG. 1 is a side view of an outboard motor.
Figure 2:
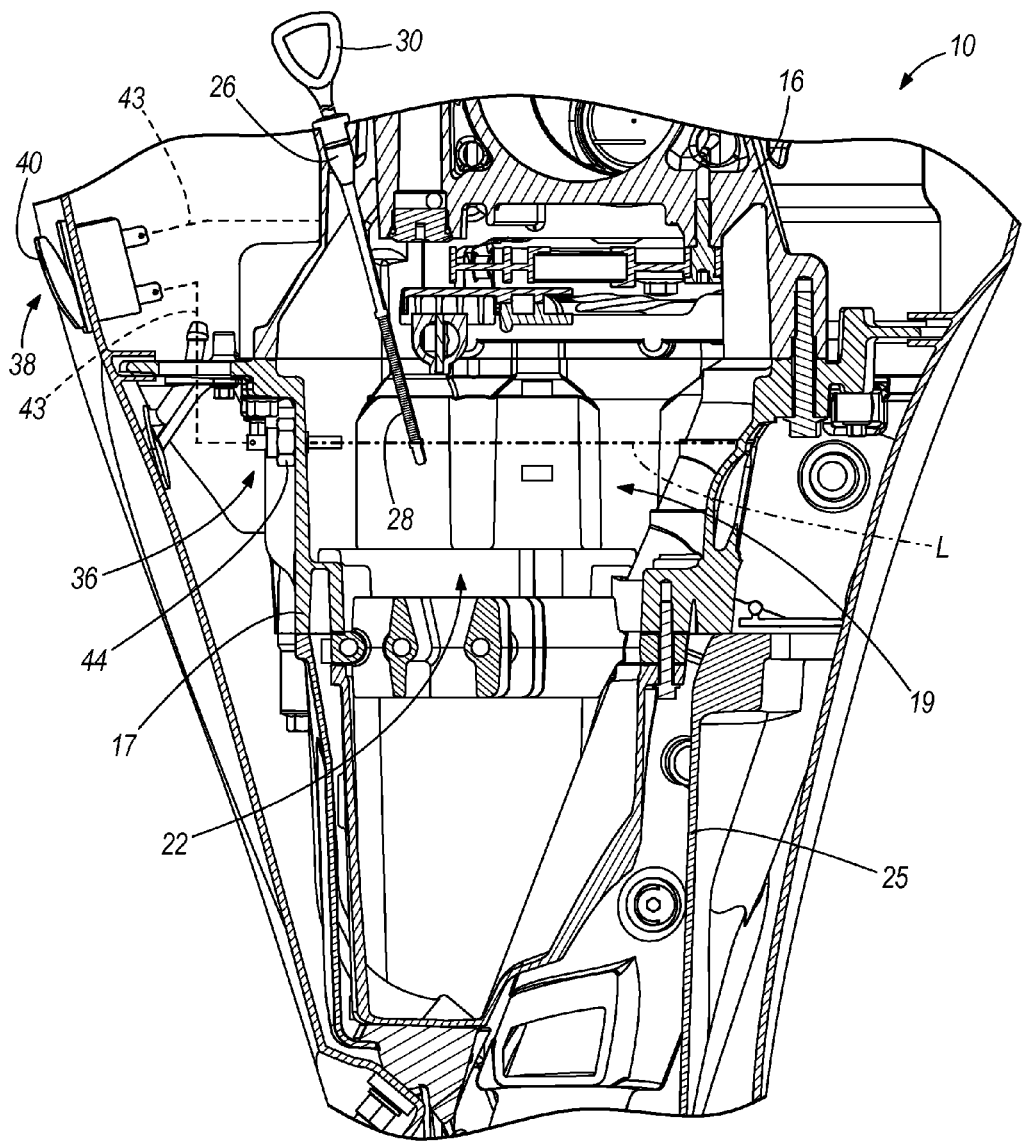
FIG. 2 is a rear sectional view looking aftward at the outboard motor and an oil sump therein.

FIGS. 1 and 2 depicts an outboard motor 10 mounted on a stern 12 of a marine vessel 14. The type and configuration of outboard motor and marine vessel is not essential and can vary from that which is shown. The outboard motor 10 has a four stroke internal combustion engine 16 that causes rotation of a propeller 18 extending from a propeller housing 20. A sump 22 is located in a drive shaft housing 25 beneath the internal combustion engine 16 and holds oil that is provided to and drained from the internal combustion engine 16. The size, configuration and orientation of the sump 22 are not critical and can vary from that which is shown. Optionally, the outboard motor 10 can be pivotally connected to the stern 12 of the marine vessel 14 by a bracket 24, which facilitates trimming movement of the outboard motor 10.

It is desirable to maintain a proper amount of oil in the sump 22 to thereby prevent damage to the internal combustion engine 16. As such, manufacturers of outboard motors typically recommend that the operator check the oil level in the sump 22 before each use of the outboard motor 10. To facilitate this task, many outboard motors 10 include a dipstick 26 that extends out of the sump 22. The operator can visually check the oil level in the sump 22 by manually withdrawing the dipstick 26 from the sump 22 and visually inspecting the oil residing on the shaft 28 of the dipstick 26. Most dipsticks have a handle 30 that resides under the cowl 32 of the outboard motor 10. As such, in order to check the oil level in the sump 22 it is necessary for the operator to first remove the cowl 32, then manually grasp the handle 30 and withdraw the dipstick 26 from the sump 22, visually inspect the dipstick 26, manually replace the dipstick 26 in the sump 22, and then replace the cowl 32 on the outboard motor 10. This is a time consuming process and can be a major inconvenience to the operator.

Figure 3:
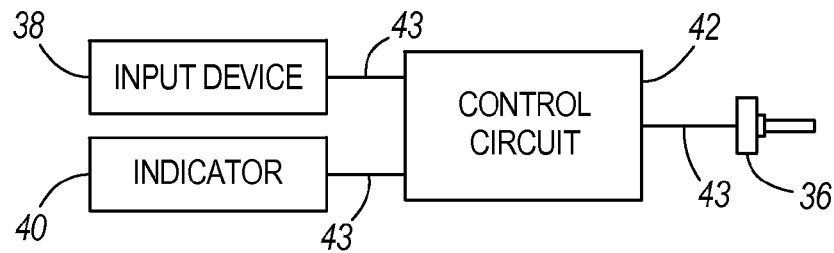
FIG. 3 is a schematic view of a system for indicating oil level in the outboard motor.

FIGS. 1-3 depict one example of a system for checking oil level in the outboard motor 10 and indicating the same to an operator in a manner that is more convenient and less time consuming than the above-described prior art methods and systems. The system can include, among other things, a sensor 36, an input device 38, an indicator 40 and a control circuit 42 in communication with the sensor 36, input device 38, and indicator 40. As set forth in the examples herein below, the particular type, configuration and location of the sensor 36, input device 38, indicator 40, and control circuit 42 can vary from that which is shown. Also, as explained below, the control circuit 42 is necessary in only some embodiments, depending upon the type of sensor 36, input device 38 and/or indicator 40 that is utilized.

Figure 5:
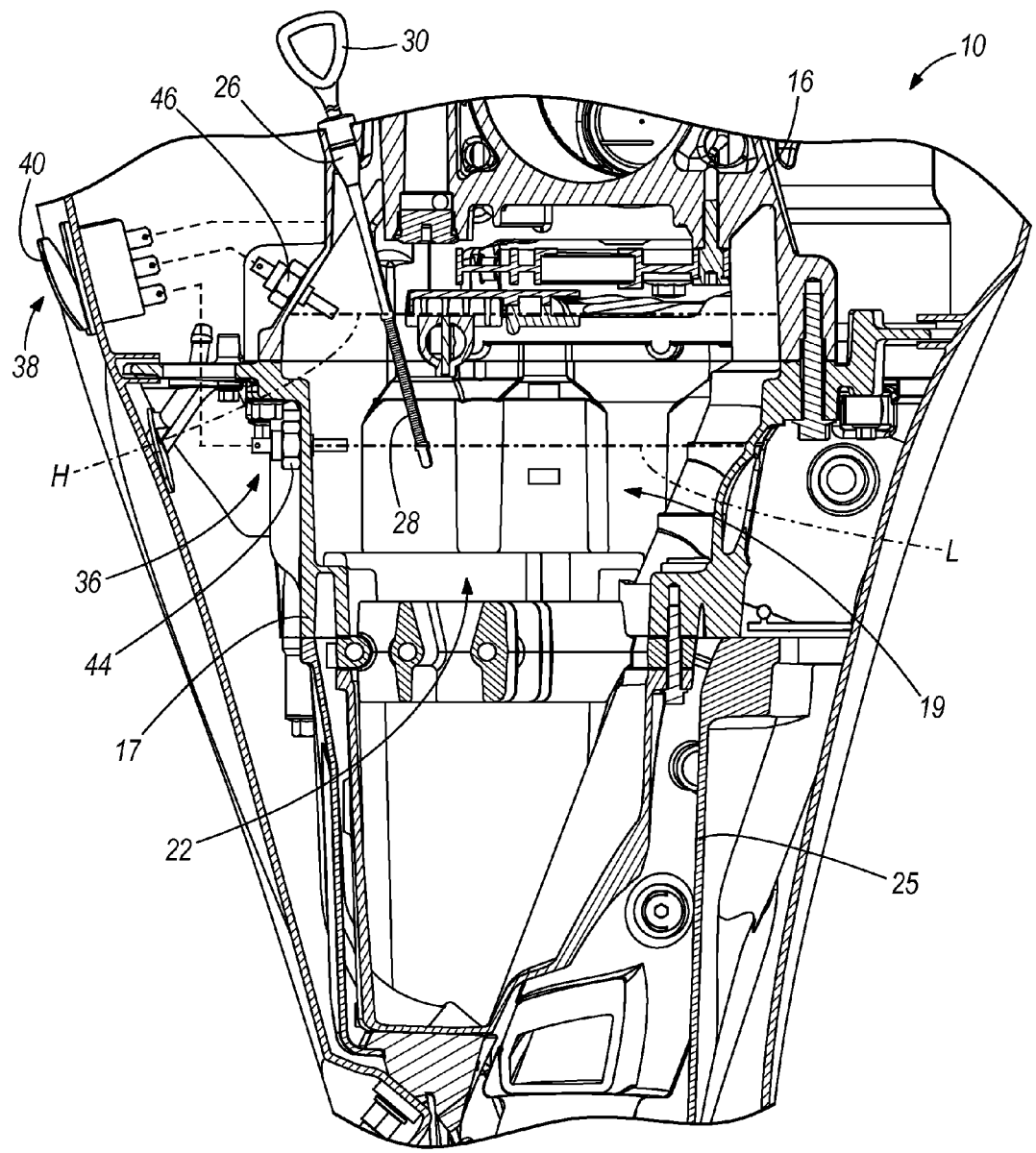
FIG. 5 is a rear sectional view looking aftward at another embodiment of the outboard motor and an oil sump therein having first and second sensor devices.

The sensor 36 is configured to sense oil level in the sump 22. The sensor 36 can include a single sensor device 44, as shown in FIGS. 1-2, or can include two or more sensor devices 44, 46, as shown in FIG. 5. In both of these examples, the sensor 36 extends through a sump wall 17 and into the interior 19 of the sump 22 and can be contacted by and/or immersed in oil in the sump 22. The first sensor device 44 can be located with respect to the sump 22 at a location L corresponding to the lowest oil level at which an operator should operate the internal combustion engine 16 and still avoid damage to the internal combustion engine 16 and achieve desired performance characteristics. The second sensor device 46 can be located with respect to the sump 22 at a location H corresponding to the highest oil level that an operator should operate the internal combustion engine 16 and still avoid damage to the internal combustion engine 16 and achieve desired performance characteristics. The sensor devices 44, 46 can comprise for example electro-thermic sensors that, while heating up, exhibit an electrical resistance characteristic that will differ depending upon whether or not the sensor device 44, 46 is in contact with liquid, such as oil. This type of sensor is commercially available from Synerject, Hella, Omega, and other companies. Other sensors such as mechanical sensors, float and/or reed sensors, ultrasonic level sensors, capacitive sensors, optical or infrared sensors, and/or the like can be used in addition to or instead of the noted electro-thermic sensor. The sensor 36 can work as a switch and/or can work as an electronic dipstick and measure a range, such as is described in the incorporated U.S. patent application Ser. No. 13/313,930. An exemplary electronic dipstick can have a resistance wire designated to cover both the maximum and minimum oil levels. In this type of dipstick, the resistance wire is heated by sending a constant current through it. A voltage drop across the wire depends on the amount of heat that is dissipated from the wire to the surrounding medium. Thus, oil level can be known, as oil conducts the heat better than air. The voltage drop value can be compared in the control circuit 42 to values in a lookup table listing voltage drop versus temperature. This type of oil level sensor is commercially available and manufactured by Siemens VDO.

The input device 38 is disposed on the outboard motor 10, and in this example is mounted on the cowl 32 for convenient access by an operator. The input device 38 can be for example a manually operable switch, such as for example a momentary switch. Other input devices can be used instead of the momentary switch, such as for example voice recognition devices, infrared readers, key pads, key fobs, and/or the like.

The indicator 40 is also disposed on the outboard motor 10, and in this example on the cowl 32 for convenient perception by an operator. In one example, the indicator includes a light, such as a light emitting diode (LED) that is incorporated with the input device 38. Other visual, audio and/or tactile indicators can be used within the scope of this disclosure, for example video screens, audio speakers, and/or the like.

The control circuit 42 is in electrical communication with the sensor 36, input device 38 and indicator 40 via one or more wired and/or wireless links 43. In some examples, the wired and/or wireless links are part of a computer area network, such as a CANBUS. In some examples, the control circuit 42 includes a programmable processor and a memory for storing information. Optionally, the control circuit 42 can include one or more control modules or sections, each having a memory and a processor for sending and receiving control signals and for communicating with peripheral devices. Different modes of operation can be programmed into the control circuit 42, as further described herein below. The programming and control operations of the control circuit 42 are described herein with respect to non-limiting examples and algorithms. Each of the following examples/algorithms includes a specific series of steps for accomplishing certain system control functions. However the configuration of the control circuit 42 and any related control circuit modules and/or sections can substantially vary from that which is shown and described. The scope of this disclosure is not intended to be literally bound by the literal order and content of steps described herein and thus non-substantial differences and/or changes are intended to fall within the scope of the disclosure.

Figure 4:
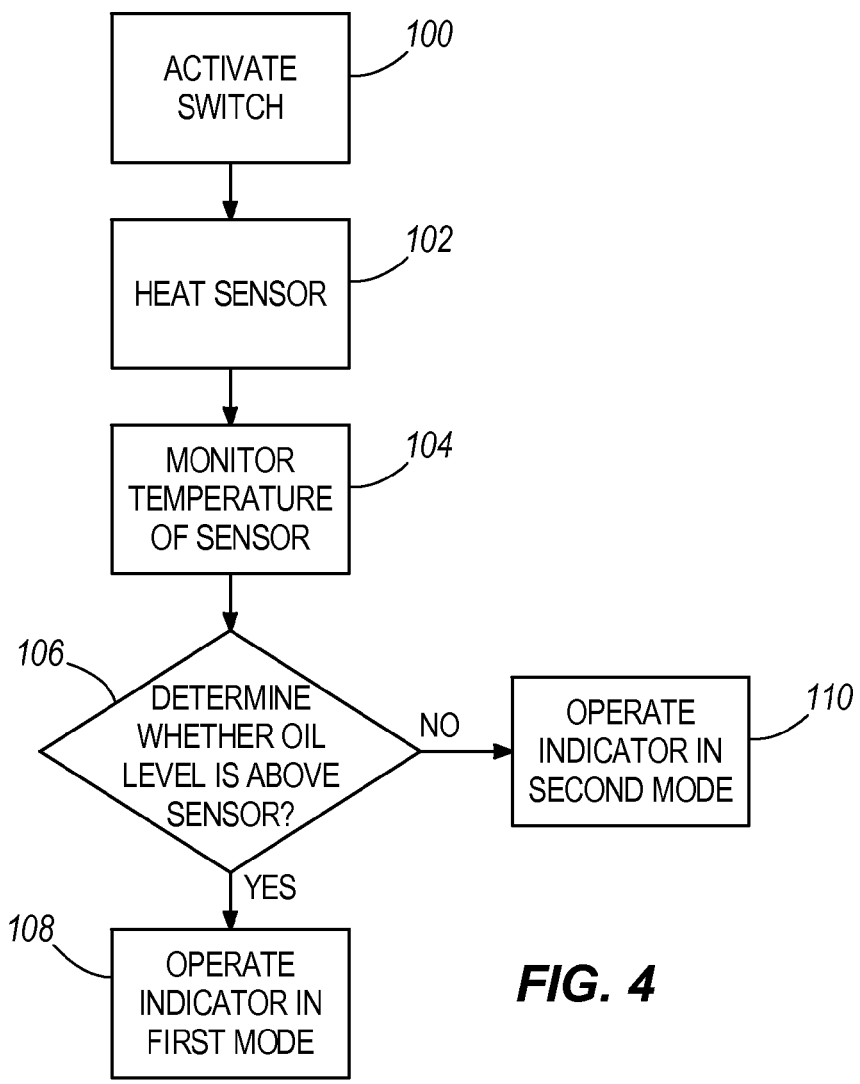
FIG. 4 is a flow chart depicting a method of for indicating oil level in an outboard motor.

Referring to FIG. 4, before starting the internal combustion engine 16, the operator can operate the system to determine whether a certain level of oil exists in the sump 22, thus conveniently allowing for verification of safe oil level in the outboard motor 10. At steps 100 and 102, operation of the system can be initiated by actuation of the input device 38 which thereby causes the sensor 36 to be heated. For example, the control circuit 42 can detect the actuation of the input device 38 and then control heating of the sensor 36. In an alternate example, actuation of the input device 38 can directly cause heating of the sensor 36, without intermediate control by control circuit 42. In some examples, actuation of the input device 38 can be an instantaneous input. In other examples, where the input device 38 comprises a momentary switch or other mechanism, the operator can hold down the input device 38, during which time the sensor 36 is heated.

At step 104, the control circuit 42 is configured to monitor the temperature of the sensor 36 as it is heated. If the sensor 36 is in contact with oil in the sump 22, the sensor 36 will not heat up as rapidly as it would if the sensor 36 is not in contact with the oil in the sump 22. Thus a small change in temperature of the sensor 36 indicates that the oil level in the sump 22 is in contact with and therefore at least as high as the location of the sensor 36. A relatively large change in temperature of the sensor 36 indicates that the oil level in the sump 22 is not in contact with and therefore not as high as the location of the sensor 36. The control circuit 42 is configured to monitor the electrical resistance associated with the sensor 36 and based on the electrical resistance determine the temperature of the sensor 36 and thus whether the oil in the sump 22 is above a certain level. A relatively large change in electrical resistance during heating of the sensor 36 indicates a large change in temperature, whereas a relatively small change in resistance indicates a small change in temperature. In some examples, the control circuit 42 is configured to compare the electrical resistance to a known resistance value, threshold and/or range stored in memory, and based upon this comparison determine whether or not the sensor 36 is in contact with oil in the sump 22 at the time that the input device 38 is actuated and the sensor 36 is heated.

At steps 108, when the control circuit 42 determines that the sensor 36 is in contact with oil, it operates the indicator 40 according to a first mode. At step 110, when the control circuit 42 determines that the sensor is not in contact with oil, the control circuit 42 operates the indicator 40 according to a second mode. The first and second modes can include different indications on the indicator 40, such as displaying light in the first mode and not displaying light in the second mode. In another example, each mode can be displayed in a different color light. Other indication methods can be employed.

In the example shown in FIG. 5, the sensor 36 includes the plurality of sensor devices 44, 46. The first sensor device 44 senses oil in the sump 22 at a first level L and the second sensor device 46 senses oil in the sump 22 at a second, higher level H. Here, the control circuit 42 is configured to operate the indicator 40 according to the first mode when the oil is higher than the second level H, according to a second mode when the oil is higher than the first level L, and according to a third mode when the oil is lower than the first level L. The first, second, and third modes can include different indications on the indicator 40, such as displaying light in the first mode, not displaying light in the second mode, and displaying flashing light in the third mode. In another example, each mode can be displayed in a different color light. Other indication methods can be employed.

The control circuit 42 is only necessary in some of the embodiments, depending upon the type of sensor 36, input device 38 and/or indicator 40 that is utilized. For example, the indicator 40 can be a light that is in series with the sensor 36 and with the input device 38. In this arrangement, upon actuation of the input device 38, if the sensor 36 is in oil it will complete the circuit and the light will go on, indicating an acceptable level of oil in the sump 22. If the sensor 36 is not in oil then the circuit will remain open and the light will not illuminate, thus indicating an insufficient level of oil in the sump 22.

What is claimed is:

1. A system for indicating oil level in an outboard motor to an operator, the system comprising: an outboard motor having a cowl that encloses an internal combustion engine that drains oil to a sump; wherein the sump comprises a bottom and sidewalls that define an interior that contains oil; a sensor on one of the sidewalls of the sump, wherein the sensor senses oil level in the sump; an input device on an outer surface of the cowl; and an indicator on the outer surface of the cowl; wherein actuation of the input device causes the sensor to determine the oil level in the sump, and the indicator to indicate the oil level to an operator.

2. The system according to claim 1, wherein the input device comprises a switch.

3. The system according to claim 2, wherein the switch comprises a momentary switch.

4. The system according to claim 1, wherein the indicator comprises a light.

5. The system according to claim 4, wherein input device comprises a switch and wherein the light is incorporated with the switch.

6. The system according to claim 1, comprising a control circuit configured to communicate with the sensor, input device, and indicator; wherein actuation of the input device causes the control circuit to communicate with the sensor to determine the oil level in the sump, and then operate the indicator to indicate the oil level to the operator.

7. The system according to claim 6, wherein the control circuit is configured to operate the indicator according to a first mode when the sensor senses that the oil is above a certain level and according to a second mode when the sensor senses that the oil is below a certain level.

8. The system according to claim 7, wherein the first mode is a display of light and wherein the second mode is no display of light.

9. The system according to claim 7, wherein the sensor comprises a plurality of sensors devices, wherein each sensor device in the plurality of sensor devices senses a different oil level in the sump.

10. The system according to claim 9, wherein the plurality of sensor devices comprises a first sensor device sensing oil in the sump at a first level and a second sensor device sensing oil in the sump at a second, higher level.

11. The system according to claim 10, wherein the control circuit is configured to operate the indicator according to a first mode when the oil is higher than the second level, according to a second mode when the oil is higher than the first level, and according to a third mode when the oil is lower than the first level.

12. The system according to claim 11, wherein the first mode, second mode and third mode each comprise a different indication on the indicator, respectively.

13. The system according to claim 6, wherein upon actuation of the input device, the sensor is heated and the control circuit is configured to monitor an electrical resistance associated with the sensor, and wherein based on the electrical resistance the control circuit is configured to determine whether the oil in the sump is above a certain level.

14. A method for indicating oil level in an outboard motor to an operator, wherein the outboard motor has a cowl that encloses an internal combustion engine that drains oil to a sump, wherein the sump comprises a bottom and sidewalls that define an interior that contains oil; a sensor on one of the sidewalk of the sump that senses oil level in the sump, an input device on an outer surface of the cowl, and an indicator on the outer surface of the cowl, and wherein actuation of the input device causes the sensor to determine the oil level in the sump and the indicator to indicate the oil level to an operator;

the method comprising actuating the input device; sensing oil level in the sump upon actuation of the input device; and operating the indicator on the outboard motor to indicate the oil level to an operator.

15. The method according to claim 14, comprising sensing oil level in the sump with the sensor.

16. The method according to claim 15, comprising monitoring an electrical resistance associated with the sensor and determining oil level based on the electrical resistance.

17. The method according to claim 14, comprising operating the indicator to provide a first indication on the indicator when the oil is above a certain level and to provide a second indication on the indicator when the oil is below a certain level.

18. The method according to claim 14, comprising sensing whether the oil is at a first level and sensing whether the oil is at a second, higher level; and further comprising operating the indicator according to a first mode when the oil is higher than the second level, according to a second mode when the oil is higher than the first level, and according to a third mode when the oil is lower than the first level.

19. The method according, to claim 18, wherein the first mode, second mode, and third mode comprise a different indications on the indicator, respectively.

20. A system for indicating oil level in an outboard motor to an operator, the system comprising:
- an outboard motor having a cowl that encloses an internal combustion engine that drains oil to a sump wherein the sump comprises a bottom and sidewalls that define an interior that contains oil;
- a sensor on one of the sidewalls of the sump, wherein the sensor exhibits an electrical resistance that varies depending upon whether the sensor is immersed in the oil in the sump;
- a momentary switch on an outer surface of the cowl, wherein pressing of the momentary switch causes heating of the sensor;
- an indicator on the outer surface of the cowl; and
- a control circuit that communicates with the sensor, the momentary switch, and the indicator; wherein the control circuit monitors the electrical resistance of the sensor as the momentary switch is pressed, determines whether the sensor is immersed in the oil in the sump based upon the electrical resistance, and thereafter controls the indicator to indicate to an operator whether the sensor is immersed in the oil in the sump.

21. The system according to claim 20, wherein the indicator comprises a light that is on the momentary switch.

* * * * *

UNITED STATES PATENT AND TRADEMARK OFFICE
CERTIFICATE OF CORRECTION

| | | |
|---|---|---|
| PATENT NO. | : 9,193,429 B1 | Page 1 of 1 |
| APPLICATION NO. | : 13/692961 | |
| DATED | : November 24, 2015 | |
| INVENTOR(S) | : Gregg D. Langenfeld | |

It is certified that error appears in the above-identified patent and that said Letters Patent is hereby corrected as shown below:

In the Claims:

In claim 14, at column 6, line 42, "sidewalk" should instead read --sidewalls--.

Signed and Sealed this
Twenty-eighth Day of June, 2016

Michelle K. Lee
*Director of the United States Patent and Trademark Office*